United States Patent [19]

Herrebrugh

[11] Patent Number: 5,317,665
[45] Date of Patent: May 31, 1994

[54] JACKET STRUCTURE FOR OPTICAL CABLES, FOR USE IN HIGH-VOLTAGE ENVIRONMENTS

[75] Inventor: Albert V. Herrebrugh, Waddinxveen, Netherlands

[73] Assignee: NKF Kabel B.V., Waddinxveen, Netherlands

[21] Appl. No.: 940,869

[22] PCT Filed: Apr. 26, 1991

[86] PCT No.: PCT/NL91/00069

§ 371 Date: Oct. 23, 1992

§ 102(e) Date: Oct. 23, 1992

[87] PCT Pub. No.: WO91/16648

PCT Pub. Date: Oct. 31, 1991

[30] Foreign Application Priority Data

Apr. 26, 1990 [NL] Netherlands ............... 9001007

[51] Int. Cl.⁵ ............... G02B 6/00; G02B 6/36; G02B 6/44
[52] U.S. Cl. ............... 385/101; 174/99 R; 174/34
[58] Field of Search ............... 174/36, 99 R, 105 R, 174/72 R, 34; 385/100, 101

[56] References Cited

U.S. PATENT DOCUMENTS

| | | | |
|---|---|---|---|
| 4,772,090 | 9/1988 | Atkins et al. | 385/101 |
| 4,776,665 | 10/1988 | Oestreich | 385/100 |
| 5,181,266 | 1/1993 | Brennecke et al. | 385/101 X |
| 5,214,733 | 5/1993 | Sadler | 385/101 X |

FOREIGN PATENT DOCUMENTS

| | | |
|---|---|---|
| 214480 | 3/1987 | European Pat. Off. |
| 112163 | 6/1987 | European Pat. Off. |
| 258028 | 3/1988 | European Pat. Off. |
| 3321921 | 12/1984 | Fed. Rep. of Germany |
| 3618659 | 12/1987 | Fed. Rep. of Germany |

OTHER PUBLICATIONS

IEEE Standard Dictionary of Electrical and Electronics Terms, Fourth Addition, Jul. 8, 1988.

*Primary Examiner*—Akm E. Ullah
*Attorney, Agent, or Firm*—Handal & Morofsky

[57] ABSTRACT

Cladding structure, in particular for optical cables (1), for use in high-voltage environments, comprising at least one elongated plastic outer sheath (8), having capacitive elements ($C_1, C_2, C_3 \ldots C_n$) electrically connected in series in the longitudinal direction of the cladding structure. Said capacitive elements are formed by electrodes (5, 7, 9; 10, 11, 12) underneath the outwardly facing side of the outer sheath (8). Said electrodes (5, 7, 9; 10, 11, 12) can be situated in a mutually offset manner in radial and/or longitudinal direction of the cladding structure. Damaging of the cladding structure due to corona discharge or tracking phenomena is effectively reduced by said series connection of capacitive elements ($C_1, C_2, C_3 \ldots C_n$).

20 Claims, 4 Drawing Sheets

JACKET STRUCTURE FOR OPTICAL CABLES, FOR USE IN HIGH-VOLTAGE ENVIRONMENTS

The invention relates to a cladding structure, in particular for optical cables, for use in high-voltage environments, comprising at least one elongated plastic outer sheath.

In practice there is an increasing trend to suspend cables for optical signal transmission on high-voltage power pylons to transmit, for example, measurement data and control commands for the purpose of electricity production and distribution. These cables may, of course, also be used for signal transmission over a long distance for the purpose of public communication systems. Railway companies may, for example, use the overhead wire supporting pylons for attaching optical telecommunication cables.

Although such solutions offer economic advantages because use can be made of an already existing infrastructure (pylons) there are, however, a number of technical disadvantages which are the consequence of the high-voltage environment to which the cables are exposed. The outer sheath of the cables concerned may be damaged, in particular, by corona discharges and by creepage path formation, termed "tracking" in the English-language specialist literature.

In practice, the cables are attached to a power pylon in an electrically conducting manner with helical suspension fixtures which are made, for example, of aluminum or steel plated with aluminum and which engages the plastic outer sheath. A cable suspended in this way is capacitively coupled to the high-voltage lines and earth and consequently forms a capacitive voltage divider. In addition, the cable is connected to earth in a conducting manner via the suspension fixtures, which are connected to the earthed pylons, and the plastic outer sheath, whose resistance is not infinitely high. As a consequence of this, a potential distribution which decreases to zero in the vicinity of the suspension points is produced over the cable.

In particular, corona discharges occur in the vicinity of the end, engaging the cable, of the helical suspension fixtures where an electrical field concentration arises as a consequence of sharp edges or points. Apart from the ends of the suspension fixtures, irregularities projecting from the outer sheath may also result in corona discharges.

Tracking occurs in the case of a wet and contaminated cable, under which circumstances an electrically conducting layer is formed on the outer sheath. As a consequence of the potential distribution described above, a current flows in the axial direction in the conducting layer formed by the moisture, from the centre of the cable to the earthed suspension points in the pylons. Because the contamination of the cable is never homogeneously distributed in practical situations, local regions having a higher current density will arise, partly as a consequence of irregularities in the cladding surface, where the moisture will evaporate and the conducting layer formed is interrupted. As a consequence of the relatively high conductivity of the wet or contaminated cable, there will be a relatively large voltage across these (narrow) interruptions, as a result of which discharge phenomena may arise. Under certain weather conditions, this process may occur virtually continuously and cause appreciable damage to the cable cladding.

In practice it is consequently desirable to protect optical cables for use in high-voltage environments as much as possible against the undesirable effects, described above, of corona discharge and tracking.

European Patent Application 0,214,480 discloses a metal-free, self-supporting optical cable for use in high-voltage environments, in which cable the core is rendered weakly electrically conducting. A conducting layer formed on the outer surface of the plastic cable cladding or jacket as a consequence of moisture or contamination is capacitively coupled to the weakly conducting core, under which circumstances, inter alia, the plastic outer sheath acts as a dielectric. As a result of this capacitive coupling, the voltage difference across an interruption of the conducting layer caused by moisture and/or contamination on the outer sheath of the cable is effectively limited, thereby preventing discharges across it.

A higher resistance value of the electrically conducting core results, however, in higher axial field strengths across the outer sheath, while a lower resistance value may result in an unacceptable heating of the cable or an unduly high radial field strength in the outer sheath. This solution suffers, moreover, from the drawback that the relatively high potential on the outer sheath in the centre between the suspension points is transferred via the conducting core up to the (earthed) suspension fixtures, which gives rise to a very high field concentration at such position, with the risk of breakdown in the outer sheath. In the case of an uncontaminated cable, transfer of electrical charge may, moreover, occur via the weakly conducting core. In order to prevent an electric shock effect to personnel on touching the cable core, special earthing measures have to be taken. Earthing the conducting core results in a current to earth with the risk that, if faults or malfunctions occur, safety may be jeopardised, in particular in the installation of conducting cables in 380 kV networks or higher.

European Patent Application 0,112,163 discloses an optical cable for use in high-voltage environments whose outer sheath has electrically conducting properties itself. This solution also has, in addition to the safety aspects already mentioned, the drawback that the electrical properties of the outer sheath can be affected in an undesirable manner by external influences such as UV radiation, acid rain and the like.

The object of the invention is to provide a jacket structure, in particular for use in optical cables in high-voltage environments, in which the risk of damage to the outer sheath as a consequence of corona discharge phenomena and tracking is reduced as much as possible while avoiding the disadvantages of the known solutions. According to the invention, this object is achieved in that capacitive elements connected electrically in series are formed in the longitudinal direction of the cladding structure underneath the outwardly facing surface side of the outer sheath.

The capacitive series circuit thus formed is essentially capacitively coupled in the radial direction of the cladding structure to a conducting layer formed during use on the outer sheath by moisture and/or contamination, the outer sheath acting as the dielectric of the radial capacitive coupling. The whole forms a capacitive voltage divider which effectively limits the voltage difference across an interruption in the conducting layer and prevents undesirable discharges. The capacitive series circuit essentially causes a local reduction in the impedance of the jacket structure to prevent undesirably high electrical field strengths.

Instead of a resistive potential compensation in the longitudinal direction of the jacket structure as known from the prior art, the solution according to the invention provides a capacitive potential compensation in the longitudinal direction. This has the important advantage that the jacket structure retains its insulating properties, for example, if used in an optical cable. The problems mentioned above in jacket structures provided with a weak electrical conduction are prevented by the solution according to the invention. As a result of providing the series circuit of capacitive elements underneath the outwardly facing side of the outer sheath, the electrical properties thereof will not, or will virtually not, be affected by external influences such as UV radiation, moisture, contamination, mechanical damage etc. The outer sheath can, moreover, retain its smooth surface, with the result that use can be made of the already existing devices and moulds for manufacturing, for example, cable jacket structures.

In the context of the present application, the term capacitive element is used for an element having, besides other electrical properties, essentially a capacitive behaviour.

European patent application 0,258,028 discloses an electrical cable, the signal transmission characteristics of which being improved by incorporating LC circuits in its insulation sheath. In an embodiment thereof, lumped mini-inductances and mini-capacitors are formed in the insulating sheath, by means of alternating sections of a relatively high concentration of a magnetic substance and sections having less or non-magnetic loading. Said mini-inductances ($L_{lump}$) form a series circuit with the intrinsic sheath inductance ($L_{distr}$) while said mini-capacitors ($C_{lump}$) form a parallel (shunt) circuit with the intrinsic sheath capacitance ($C_{distr}$), such that a cable acting as a low pass filter is obtained.

However, in contrast with the present application, said mini-capacitors ($C_{lump}$) do not form a series connection of capacitive elements in longitudinal direction of the cable, i.e. its jacket structure, according to the present invention. The problem of protecting, for example, an optical cable from damaging due to corona discharge and tracking phenomena is not mentioned nor dealt within said publication.

German patent application 3,321,921 discloses the use of "potential electrodes" for the purpose of monitoring and/or protecting the insulation of opto-electronic devices. Said potential electrodes comprise electrically conductive earthed sections spaced apart in longitudinal direction of the device, for example wires or clamps provided at the outside of a device, or conductive areas inside an insulating cover of a device. Electrical charge as a result of high voltage break-down or flash-overs across the insulating cover between the input and output of a device will be discharged to earth.

In order to guarantee a sufficient coefficient of signal coupling between the input and output of a device, said potential electrodes must be spaced apart at a sufficient distance with respect to the optical wavelength range used by said device. Accordingly, said potential electrodes provide not a series circuit of capacitive elements in longitudinal direction of a jacket structure according to the present invention. The problem of protecting the outer sheath of, for example, an optical cable from to corona discharge or tracking phenomena is also not discussed neither dealt with in said German patent application.

An embodiment of the invention provides a jacket structure wherein the capacitive elements each comprise a first electrode and second electrode situated in a mutually offset manner in the radial direction of the jacket structure, the electrodes of elements situated adjacently in the longitudinal direction of the jacket structure being electrically interconnected in a manner such that a series circuit of elements is formed. In this embodiment, the electrodes of the separate elements extend in the longitudinal direction of the jacket structure.

A further embodiment of the invention provides a jacket structure wherein the capacitive elements each comprise a first electrode and second electrode situated in a mutually offset manner in the longitudinal direction of the jacket structure, the electrodes of elements situated adjacently in the longitudinal direction of the jacket structure being electrically interconnected in a manner such that a series circuit of elements is formed. In this embodiment the electrodes extend in the radial direction of the jacket structure.

In both embodiments, a plurality of separate or coupled capacitive series circuits can be employed by forming a plurality of capacitive elements in the radial direction of the jacket structure.

A series circuit of the capacitive elements which is technically advantageous with respect to the embodiments mentioned is obtained by providing elements situated adjacently in the longitudinal direction of the jacket structure with a common electrode. The advantage achieved with this embodiment of the invention is the absence of separate connecting conductors between the electrodes of adjacently situated elements.

In yet a further embodiment of the jacket structure according to the invention in which the capacitive elements each comprise first and second electrodes situated in a mutually offset manner in the radial direction of the jacket structure and in which the outer sheath is cylindrical in shape, the first electrode and second electrode are formed as concentrically arranged cylinders having an open or closed surface. The provision of the elements situated adjacently in the longitudinal direction of the jacket structure with a common electrode is achieved in yet a further embodiment of the invention by arranging the concentric cylinders situated in an offset manner in the radial direction of the jacket structure so as to partially overlap when viewed in the longitudinal direction of the jacket structure.

The concentric cylinders can be produced in various ways, such as, for example, in an embodiment of the invention wherein the first and second electrodes are each composed of layers, applied with gaps to a surface of a foil or strip of electrically insulating material, of a material which is able to rearrange electrical charge, which foil or strip is incorporated in the jacket structure in a folded or wrapped manner in the longitudinal direction. To form capacitive elements, at least two foils or strips must be used in each case, between which a suitable dielectric can be incorporated in order to obtain the electrical properties of the elements intended, for example, for a specific application. A structurally simpler embodiment is one wherein the first and second electrodes, respectively, are applied to one surface and to the other surface of an electrically insulating foil or strip, the foil or strip acting as dielectric between the electrodes.

The incorporation of foils or strips in a jacket structure is a technique which is known per se in practice and of which use can advantageously be made in the embodiments mentioned. To produce this type of jacket structure according to the invention, use can therefore be made of the equipment known in practice.

This last point also applies to yet another embodiment of the jacket structure according to the invention, wherein the first and second electrodes of the capacitive elements are composed of filling material which is introduced into the jacket structure and which is able to rearrange electrical charge. With the aid of, for example, an extrusion process having two extrusion heads, it is possible to provide a composite plastic outer sheath of which the filling material mentioned forms part. It is possible to manufacture both the embodiment having capacitive elements built up from electrodes situated in a mutually offset manner in the radial direction of the jacket structure and also elements having electrodes situated in a mutually offset manner in the longitudinal direction of the jacket structure, with the aid of the filling material mentioned.

Apart from extrusion, the filling material can also be introduced into the cladding structure by intermittent injection. For the embodiment in which the first and second electrodes of a capacitive element are situated in a mutually offset manner in the radial direction, the second electrodes can be produced, after the provision of a foil or strip of electrically insulating material which acts as dielectric, in a subsequent injection step. Preferably, the respective first and second electrodes are provided in an overlapping manner.

It has been found that the materials for bringing about the intended electrical properties do not on the whole form a critical factor. A material such as carbon (C) is already adequate. Mixtures of metallic elements (silver, aluminium etc.) dispersed in hot-melt (glue) can also be used. Foils or strips having a carbon layer or vacuum deposited aluminium layer are obtainable commercially. In general, the first and second electrodes can be composed of material having metallically conducting, ionically conducting, semiconducting or polarisable electrical properties, or of combinations of these materials.

The invention also relates to an optical cable comprising a core of one or more optical fibres, around which core a jacket structure according to one or more of the embodiments described above is provided.

The invention furthermore relates to a self-supporting optical cable, in particular for use as a suspension cable in the electrical environment of high-voltage overhead lines, comprising a central element of electrically insulating material, one or more optical fibres supported by said central element, which fibres are surrounded by a jacket of electrically insulating material inside which one or more of the fibres is/are able to move freely, a belt of electrically insulating material, and a jacket structure which is built up of electrically insulating material and comprises at least a reinforcing layer and an outer sheath, which jacket structure is provided with capacitive elements according to one or more of the embodiments discussed above. An inner sheath can, if necessary, be provided around the belt.

The outer sheath may be manufactured, for example, from high-density polyethene (HDPE), the reinforcement layer of aramid threads and the inner sheath of polyethene.

Some embodiments of the jacket structure according to the invention are explained below with reference to the drawing.

Components having a similar function or structure are indicated in FIGS. 1-5 by the same reference numerals. For the sake of clarity, the diverse components are not shown mutually to scale.

Figure 1:
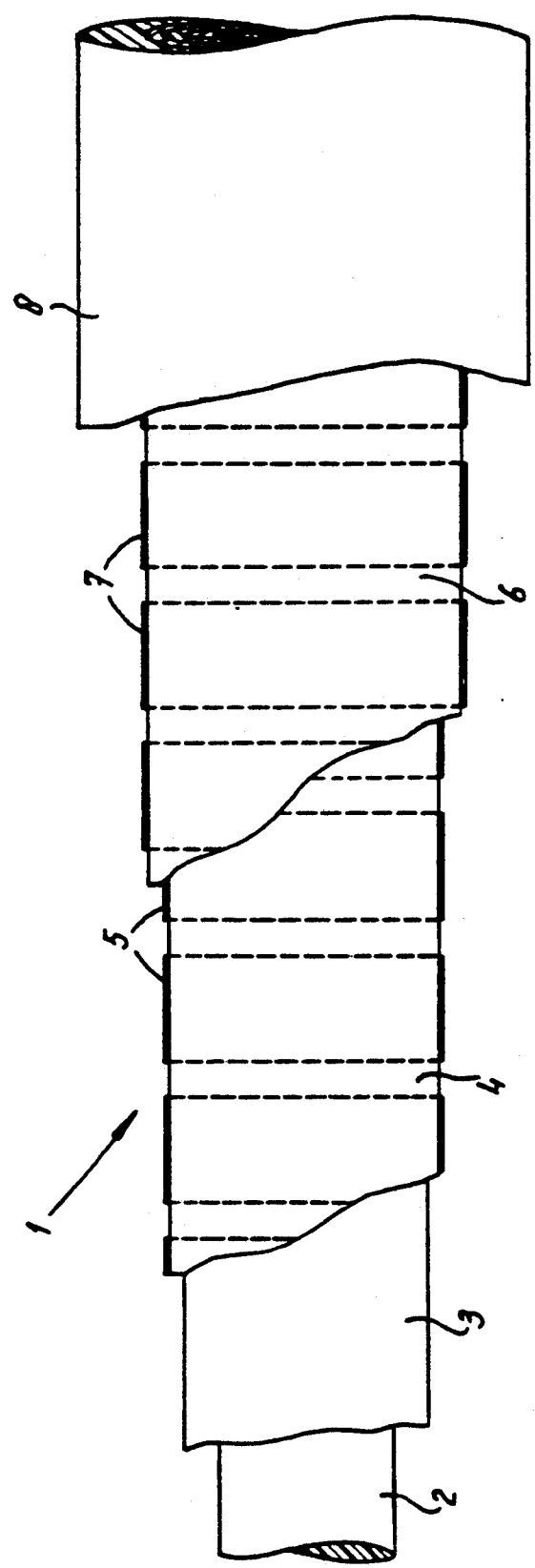
FIG. 1 shows diagrammatically a partially cut-away cable provided with capacitive elements in accordance with an embodiment of the invention.

The cable 1 shown diagrammatically in FIG. 1 and partially cut away comprises a core 2 which may comprise one or more optical fibres and possibly one or more electrical conductors (not shown). Optionally provided around the core 2 is a cylindrical inner sheath 3. Provided on the inner sheath 3 is a first support 4 in the form of a foil or strip of electrically insulating material (for example plastic). On said support 4, regions 5 of a material which is able to rearrange electrical charge are provided. In the embodiment shown, the regions 5 are cylinders formed around the circumference of the inner sheath 3.

Provided over the first support 4 is a second support 6 of electrically insulating material, for example also of plastic, which second support 6 is provided with regions 7 of a similar material to the regions 5. The regions 7 are also cylindrical in the embodiment shown. The whole is surrounded by a plastic outer sheath 8.

The regions 5 and 7 which partially overlap one another form respectively the first and second electrodes of plate-type, cylindrical capacitor elements. In the embodiment shown, the support 6 acts as dielectric.

Figure 2:
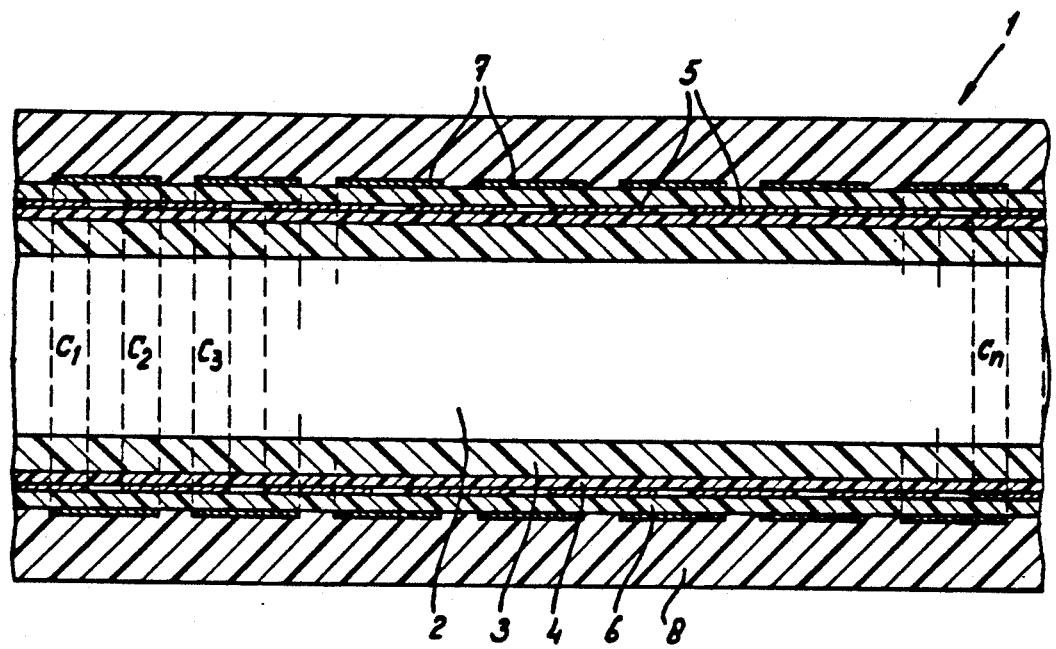
FIG. 2 shows diagrammatically, partially in elevation, the longitudinal section through the cable according to FIG. 1.

As is illustrated diagrammatically in the longitudinal section of the cable 1 in FIG. 2, the overlapping regions form a series circuit of capacitor elements $C_1$, $C_2$, $C_3$ . . . $C_n$ in the longitudinal direction of the cable 1. When neglecting the edge effects, the capacitance value of the separate capacitor elements is determined by the geometry and the surface area over which the regions 5, 7 overlap one another, their mutual spacing in the radial direction and the relative permittivity of the dielectric.

The supports 4, 6 may each be composed, for example, of foil which is folded around the inner sheath 3 in the longitudinal direction. Instead of a foil, it is also possible to use strips or tapes which are wrapped (wound) around the inner sheath 3. Instead of the support 6, a separate layer of dielectrical material (not shown) may also be provided between the regions 5 and 7. Said dielectric layer is applied to the support 4, after which the support 6 is applied with the regions 7 facing said dielectric layer.

Figure 3:
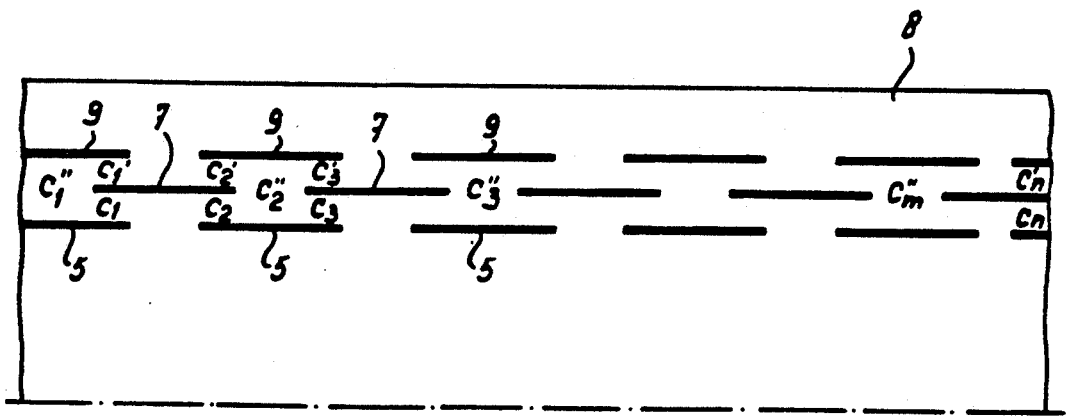
FIG. 3 shows diagrammatically, partially in elevation, the longitudinal section through a cable built up in accordance with FIG. 1, in which a plurality of capacitive elements are formed in the radial direction.

It is, of course, also possible to provide a plurality of supports 4, 6 which can again partially overlap one another to form a plurality of elements having capacitive properties situated in an offset manner in the radial direction of the cable 1, as is shown diagrammatically, for example, in FIG. 3. Here a portion of a longitudinal section through a cable built up in accordance with FIG. 1 is shown, there being applied over the support 6, however, a further insulative support material supporting third electrode regions 9 which overlap the regions 7 of the support 6. A plurality of coupled series circuits of capacitive elements, capacitor elements $C_1, C_2, C_3 \ldots C_n$ is then produced between the mutually overlapping regions 5 and 7, $C'_1, C'_2, C'_3 \ldots C'_n$ between the mutually overlapping regions 7 and 9 and capacitor elements $C''_1, C''_2, C''_3 \ldots C''_m$ between the regions 5 and 9 respectively.

In the cable according to FIG. 1, the regions 5, 7 can also be formed on a single support, on one side and the other side thereof, respectively. The regions concerned do not in that case necessarily have to overlap each other, but may be suitably interconnected, for example, via electrically conducting tracks applied to the support concerned in order to form one or more series circuits of capacitive elements. Of course, the regions 5, 7 do not need to be formed as cylinders, but they may also comprise a plurality of separate segments, it being possible for segments of the regions 5 to be overlapped by segments of the regions 7, etc. (not shown).

It can be shown that in a cable structure built up according to FIG. 1, in which the regions 5 and 7, respectively, have a length of 10 mm and a mutual spacing in the longitudinal direction of 6 mm, the capacitor elements $C_1, C_2, C_3 \ldots C_n$ each have a capacitance of approximately 175 nF if an inner sheath 3 having an external diameter of 5.975 mm and supports 4, 6 each having a thickness of 0.025 mm and a relative permittivity of 3.3 is used. For alternating voltage applications with a frequency of 50 Hz, the jacket impedance Z has a value of approximately $4.5 \cdot 10^6 \Omega/m$. A plastic outer sheath of, for example, high density polyethene (HDPE), which is used in practice, has a longitudinal resistance of $8 \cdot 10^{12} \Omega/m$ in the dry and clean state. In general, it is the case that if the longitudinal impedance of the cable is in the region between $10^4$–$10^{10}$ $\Omega/m$, an effective protection against the occurrence of undesirable discharges at the outer sheath can be achieved.

Figure 4:
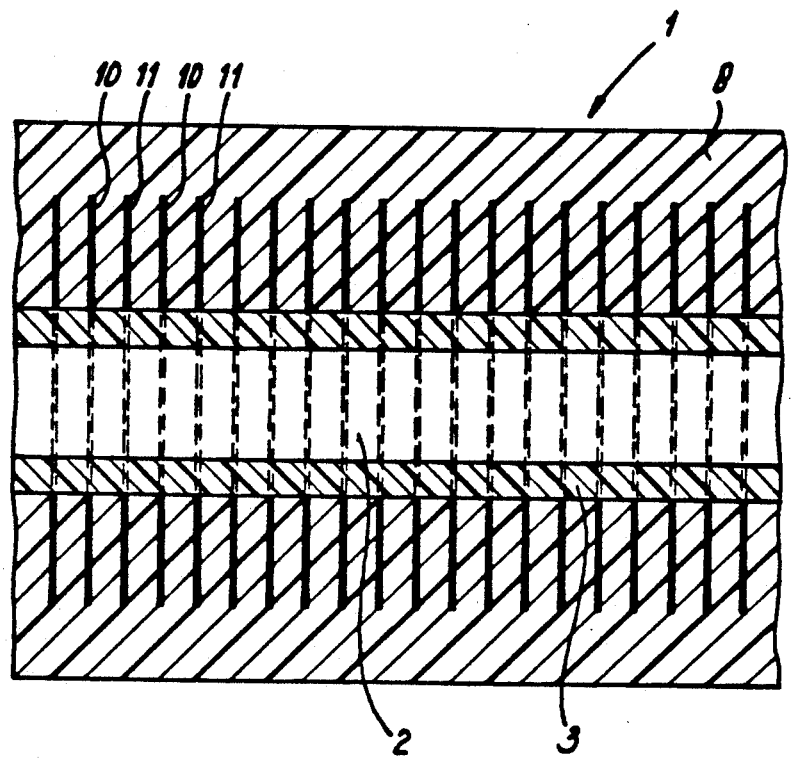
FIG. 4 shows diagrammatically, partially in elevation, the longitudinal section through a cable in which the capacitive elements each comprise electrodes situated in a mutually offset manner in the longitudinal direction of the jacket structure.

Instead of capacitive elements whose first and second electrodes are situated in a mutually offset manner in the radial direction, as, for example, in the structure according to FIG. 1, it is also possible to obtain a series circuit of capacitive elements according to the invention with first and second electrodes situated in a mutually offset manner in the longitudinal direction of the jacket structure as indicated diagrammatically in FIG. 4.

FIG. 4 shows a longitudinal section through a cable in which regions 10, 11 situated in a mutually offset manner in the longitudinal direction and made of material which is able to rearrange electrical charge are provided. The regions 10, 11 may, for example, be disc-shaped in a manner such that a single series circuit of plate capacitors is formed, but they may also be built up of separate segments, as a result of which a plurality of separate series circuits is formed.

In the embodiment according to FIG. 4, a plurality of capacitive elements can also be formed in the radial direction of the jacket structure. For this purpose, a further region 12 of a material which is able to rearrange electrical charge is provided between the regions 10 and 11. The regions 10, 11, 12 may per se again be of annular construction or built up of a plurality of segments. A plurality of coupled series circuits can be formed by allowing the adjacent segments of the regions to overlap (not shown). Here again, it is the case that the capacitive properties are determined by the mutual spacing of the regions 10, 11, 12, their surface area situated mutually opposite and the permittivity of the material between the regions 10, 11, 12.

Figure 5:
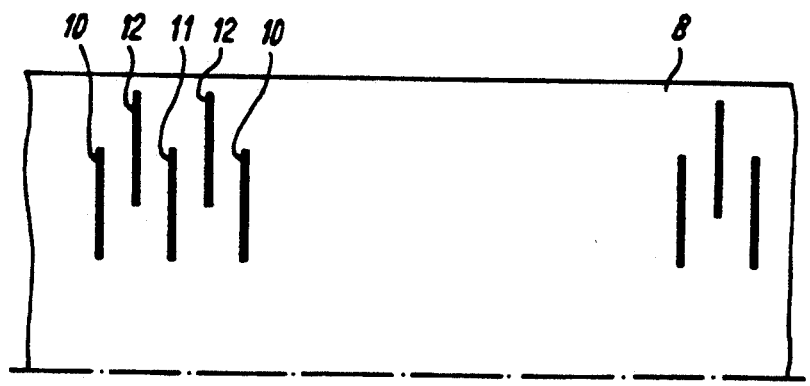
FIG. 5 shows diagrammatically, partially in elevation, the section through a cable in which a plurality of capacitive elements in accordance with FIG. 4 are formed in the radial direction.

The embodiments of the invention as shown in FIGS. 4 and 5, can be formed, for example, by incorporating in the outer sheath 8 filling material which is able to rearrange electrical charge. Such a composite outer sheath can be manufactured with the aid of an extrusion process employing two extrusion heads, one for the filling material and the other for the material of the outer sheath. The filling material can also be introduced during the formation of the cladding structure by low- or high-pressure injection.

The embodiments of the invention as shown diagrammatically in FIGS. 2 and 3 can also be manufactured by introducing into the cladding structure filling material which is able to rearrange electrical charge. In that case, the regions 5 can be applied intermittently to the inner sheath 3. As a result of then providing a dielectric layer over the regions 5 and the inner sheath 3, respectively, the regions 7 can be formed, for example in an overlapping manner, in a following processing step, also by injection of filling material. If necessary, a further dielectric layer and regions 9 can be formed (FIG. 3). Of course, the regions 5, 7 and/or 9 may also form part of the outer sheath 8.

The filling material used may be any material having metallically conducting, ionically conducting, semiconducting or polarisable electrical properties, if necessary in combination. The properties of the materials used have proved to be not at all critical. A material such as carbon (C) is already adequate. Mixtures of metallic elements such as silver or aluminium dispersed in hot-melt (glue) may be used as filling material. Foils or strips having a carbon layer or a vacuum deposited aluminium layer are available commercially.

Figure 6:
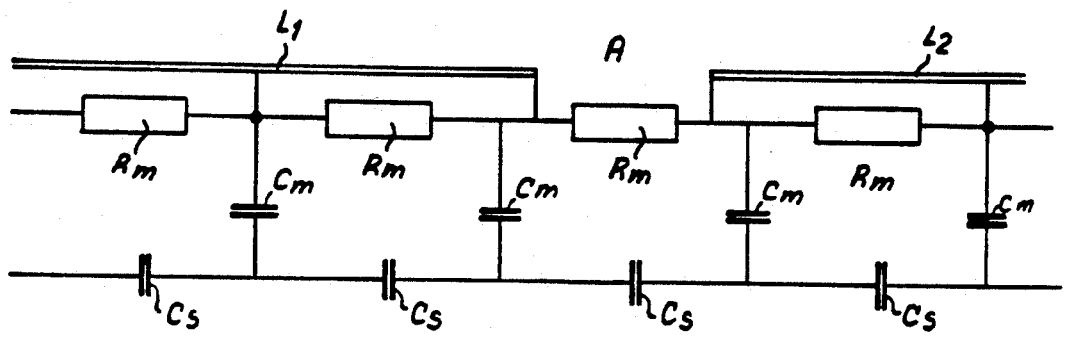
FIG. 6 shows the equivalent circuit diagram of a cable according to FIG. 2, 3 or 4.

FIG. 6 shows the electrical equivalent circuit of the cable structure as shown in FIG. 1. In this figure:

$C_s$=capacitance of the separate elements having capacitive properties, connected in series, $R_m$=intrinsic resistance of the outer sheath, and $C_m$=radial cable capacitance of the outer sheath.

$L_1$ and $L_2$ denote two conducting layers formed on the outer sheath by, for example, contamination or moisture. Between the layers $L_1$ and $L_2$ there is an interruption A. In the case of a cable which is suspended between high-voltage pylons, the layer $L_1$ could be connected to the earthed pylon via a suspension fixture. The layer $L_2$ could be coupled via capacitive voltage division to the earth and one or more high-voltage lines.

In the case of a cable which is not provided with a series circuit of capacitive elements $C_s$ according to the invention, the potential across the interruption A can be so high that discharge phenomena occur, all this being dependent, of course, on the dimensions of the interruption in the longitudinal direction of the cable. With the series circuit of elements $C_s$ according to the invention, a local rearrangement of electrical charge is now achieved which is such that a discharge cannot, or virtually cannot, take place across the interruption A and the outer sheath is consequently not damaged thereby.

Figure 7:
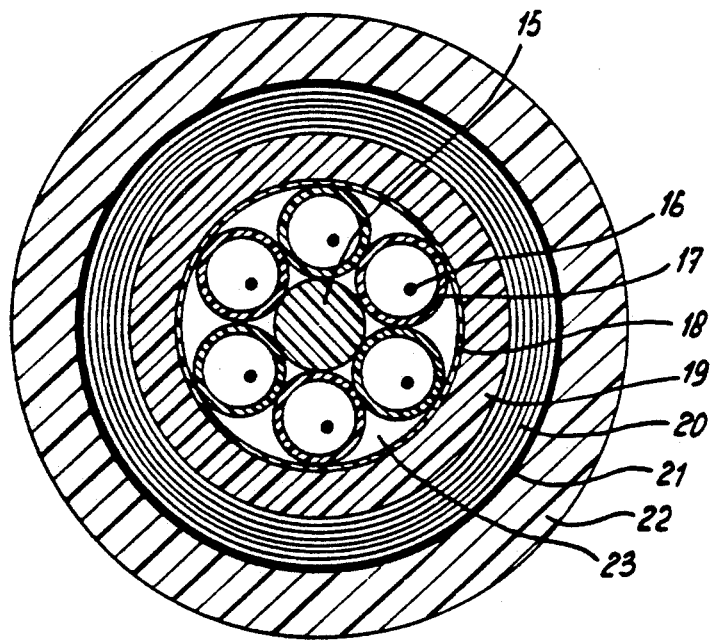
FIG. 7 shows diagrammatically a cross section of an embodiment of an optical cable provided with elements, formed under the outer sheath, in accordance with the invention.

FIG. 7 shows a cross section through an embodiment of an optical suspension cable provided with a jacket structure according to the invention.

The reference numeral 15 shows a central element manufactured, for example of fibre-reinforced plastic. The central element has, for example, a diameter of 2 mm. Situated around the central element are six optical fibres 16 having, for example, a diameter of 0.2–0.3 mm. Each optical fibre has a plastic layer, the so-called primary coating, which is not shown, adhering to its glass surface. Each optical fibre is surrounded by a loose plastic so-called secondary coating, helically wounded around the optical fibre 16. The fibre 16 is able to move freely inside said coating. The diameter of the secondary coating is, for example, 2 mm. Further embodiments of the optical cable having, for example 8 or 12 optical fibres are also possible. Provided around the secondary coating 17 is a belt 18 of electrically insulating material, which is surrounded by an inner sheath 19 of, for example, polyethene. Provided around said inner sheath 19 is a reinforcing layer 20 of, for example, aramide yarns. Situated between the inwardly facing surface of the plastic outer sheath 22 made, for example, of HDPE (high-density polyethene) and the reinforcing layer 20 is a series circuit of capacitive elements according to the invention, which is shown as a single layer 21 for the sake of simplicity. The gap between the secondary coating 17 and the belt 18 and the gap between the secondary coatings 17 can be filled with a water blocking compound 23.

It will be clear that the essential elements of the optical cable having a jacket structure according to the invention are the optical fibres 16, the series circuit of capacitive elements 21 and the outer sheath 22. The other elements can be optionally present.

In the jacket structure according to the invention, the outer sheath may be composed, of course, of diverse polymers and be provided, furthermore, with additives such as ATH ($Al_2O_3 \cdot 3H_2O$) and the like in order to render the cable less susceptible to discharges.

It is self-evident that the invention is not limited to the embodiments of the cable jacket structures shown, but is in general applicable to jacket structures for use in high-voltage environments, which are in general to be understood as meaning environments containing high electrical field strengths in the above description and in the claims.

I claim:

1. A jacket structure for energy-transmissive cables (1) intended for use in a high-voltage environment, said jacket structure comprising:
   a) at least one elongated plastic outer sheath (8) with an external surface extending in a longitudinal direction and subject to the formation of interrupted, conductive layers on said external surface; and
   b) a plurality of capacitive elements ($C_1, C_2, C_3 \ldots C_n$) disposed along, and electrically connected in series in said longitudinal direction of said outer sheath (8), said capacitive elements ($C_1, C_2, C_3 \ldots C_n$) being covered by said external surface of said outer sheath (8);

whereby said jacket structure forms a capacitive voltage divider to limit voltage differences across said conductive layer interruptions and prevent undesired discharges.

2. A jacket structure according to claim 1, wherein said capacitive elements ($C_1, C_2, C_3 \ldots C_n$) each comprise a first electrode (5) and a second electrode (7) said first and second electrodes being mutually offset in a radial direction perpendicular to said longitudinal direction of said outer sheath, said first and second electrodes being electrically interconnected to form a series circuit of said capacitive elements ($C_1, C_2, C_3 \ldots C_n$).

3. A jacket structure according to claim 2, wherein pairs of said elements ($C_1, C_2, C_3 \ldots C_n$) situated adjacently in said longitudinal direction of said jacket structure have a common electrode (5, 7).

4. A jacket structure according to claim 2, wherein a plurality of said capacitive elements ($C_1, C_2, C_3 \ldots C_n; C_1', C_2', C_3' \ldots C_n'; C_1'', C_2'', C_3'' \ldots C_m''$) is formed in said radial direction of said jacket structure.

5. A jacket structure according to claim 4, wherein pairs of said elements situated adjacently in said longitudinal direction of said jacket structure have a common electrode (7).

6. A jacket structure according to claim 2, wherein said outer sheath (8) is cylindrical in shape and said first and second electrodes (5, 7) are cylindrical and arranged concentrically with said sheath.

7. A jacket structure according to claim 6, wherein said concentrically cylindrical electrodes situated in an offset manner in said radial direction of said jacket structure are arranged so as to partially overlap when viewed in said longitudinal direction of said jacket structure.

8. A jacket structure according to claim 7, comprising a foil or strip (6) of dielectric material between said first and second electrodes (5, 7, 9).

9. A jacket structure according to claim 7, wherein said first and second electrodes (5, 7) are respectively constituted by gapped layers of electrode material disposed on a surface of a foil or strip (4, 6) of electrically insulating material, said electrode material being a material capable of rearranging electrical charge, said foil or strip (4, 6) being incorporated in said jacket structure in a folded or wrapped manner in said longitudinal direction of said outer sheath.

10. A jacket structure according to claim 9, wherein said first and second electrodes (5, 7) are respectively disposed on opposed surfaces of said foil or strip (6), said foil or strip (6) acting as dielectric between said first electrodes (5) and said second electrodes (7).

11. A jacket structure according to claim 1, wherein said capacitive elements ($C_1, C_2, C_3 \ldots C_n$) each comprise a first electrode (5) and a second electrode (7) said first and second electrodes being mutually offset in said longitudinal direction of said outer sheath, said first and second electrodes being electrically interconnected to form a series circuit of said capacitive elements ($C_1, C_2, C_3 \ldots C_n$).

12. A jacket structure according to claim 11, wherein elements ($C_1, C_2, C_3 \ldots C_n$) situated adjacently in said longitudinal direction of said jacket structure have a common electrode (10, 11, 12).

13. A jacket structure according to claim 11, wherein a plurality of capacitive elements ($C_1, C_2, C_3 \ldots C_n; C_1^1, C_2^1, C_3^1 \ldots C_n^1; C_1'', C_2'', C_3'' \ldots C_m''$) is formed in a radial direction perpendicular to said longitudinal direction of said jacket structure.

14. A jacket structure according to claim 13, wherein elements ($C_1, C_2, C_3 \ldots C_n$; $C_1', C_2', C_3' \ldots C_n'$) situated adjacently in said longitudinal direction of said jacket structure have a common electrode (10, 11, 12).

15. A jacket structure according to claim 1, wherein said capacitive elements ($C_1, C_2, C_3 \ldots C_n$) are comprised by filling material being a material capable of rearranging electrical charge.

16. A jacket structure according to claim 15, wherein said filling material forms part of said plastic outer sheath (8).

17. A jacket structure according to claim 16, wherein said filling material was introduced into said plastic outer sheath (8) by intermittent injection.

18. A jacket structure according to claim 1, wherein said capacitive elements ($C_1, C_2, C_3 \ldots C_n$) are formed of a material having at least one property selected from the group consisting of metallically conducting, ionically conducting, semiconducting and polarisable electrical properties.

19. An optical cable (1) intended for use in a high-voltage environment, said optical cable comprising a core of one or more optical fibers and a jacket structure, said jacket structure comprising:
 a) at least one elongated plastic outer sheath (8) with an external surface extending in a longitudinal direction and subject to the formation of interrupted, conductive layers on said external surface; and
 b) a plurality of capacitive elements ($C_1, C_2, C_3 \ldots C_n$) disposed along, and electrically connected in series in said longitudinal direction of said outer sheath (8), said capacitive elements ($C_1, C_2, C_3 \ldots C_n$) being covered by said external surface of said outer sheath (8);

whereby said jacket structure forms a capacitive voltage divider to limit voltage differences across said conductive layer interruptions and prevent undesired discharges.

20. A self-supporting optical cable for use as a suspension cable in an electrical environment of high-voltage overhead lines, said optical cable comprising:
 a) a central core (15) of electrically insulating material;
 b) one or more optical fibers (16) supported by said central element (15);
 c) an electrically insulating sheath (17) surrounding each said fibre (16) with limited freedom of movement of a fibre (16) within said sheath (17);
 d) a belt (18) of electrically insulating material around said sheathed fibers (16); and
 e) a jacket structure (19-22) of electrically insulating material and comprising:
  i) a reinforcing layer (20);
  ii) an elongated outer sheath (22) with an external surface extending in a longitudinal direction; and
  iii) a plurality of capacitive elements ($C_1, C_2, C_3 \ldots C_n$) disposed along, and electrically connected in series in said longitudinal direction of said outer sheath (8), said capacitive elements ($C_1, C_2, C_3 \ldots C_n$) being covered by said external surface of said outer sheath (8).

* * * * *